Figure 3:
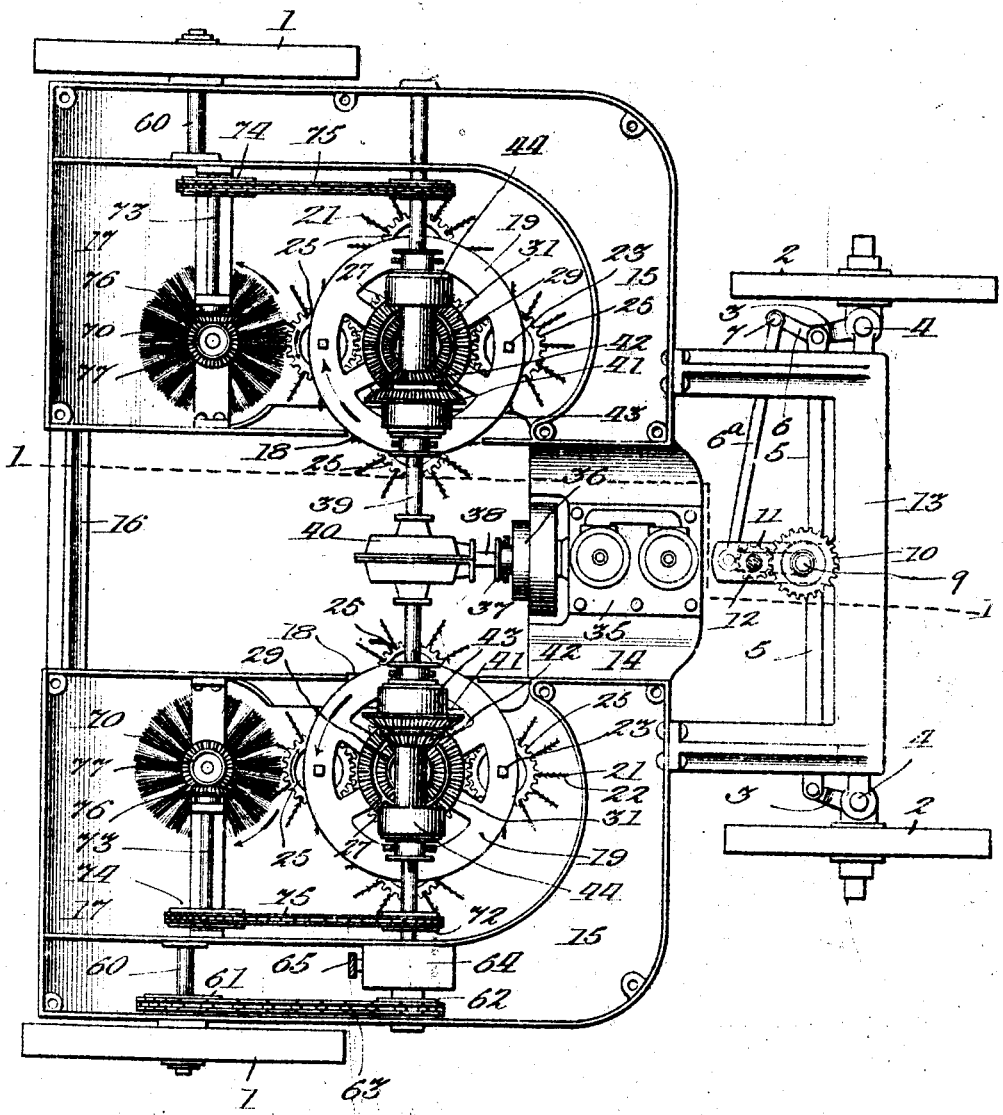

H. S. GREENE.
COTTON HARVESTER.
APPLICATION FILED MAY 25, 1911.
1,057,236.
Patented Mar. 25, 1913.
4 SHEETS—SHEET 1.
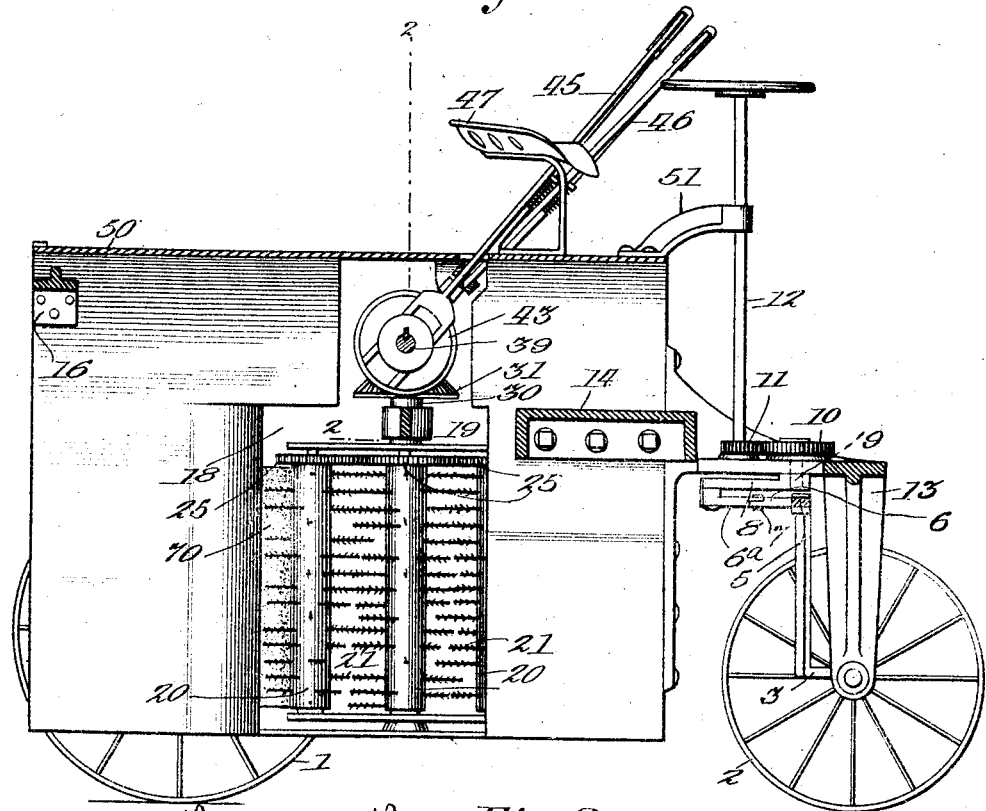
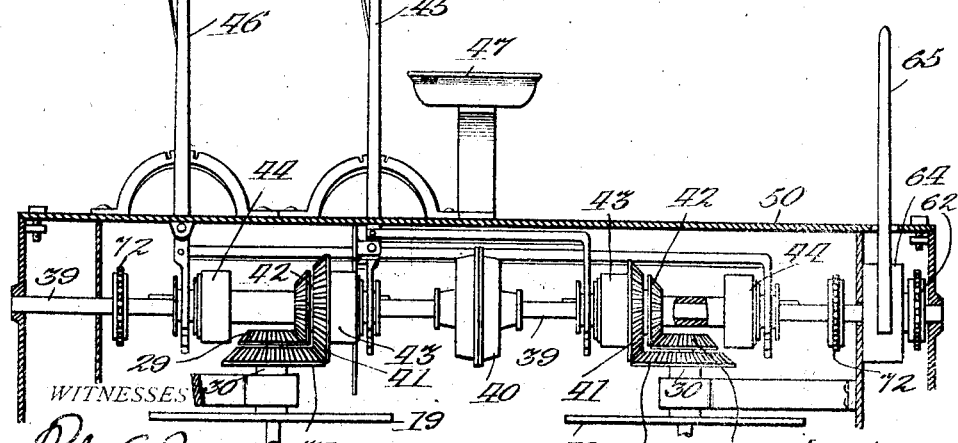

H. S. GREENE.
COTTON HARVESTER.
APPLICATION FILED MAY 25, 1911.

1,057,236.

Patented Mar. 25, 1913.
4 SHEETS—SHEET 2.

WITNESSES

INVENTOR

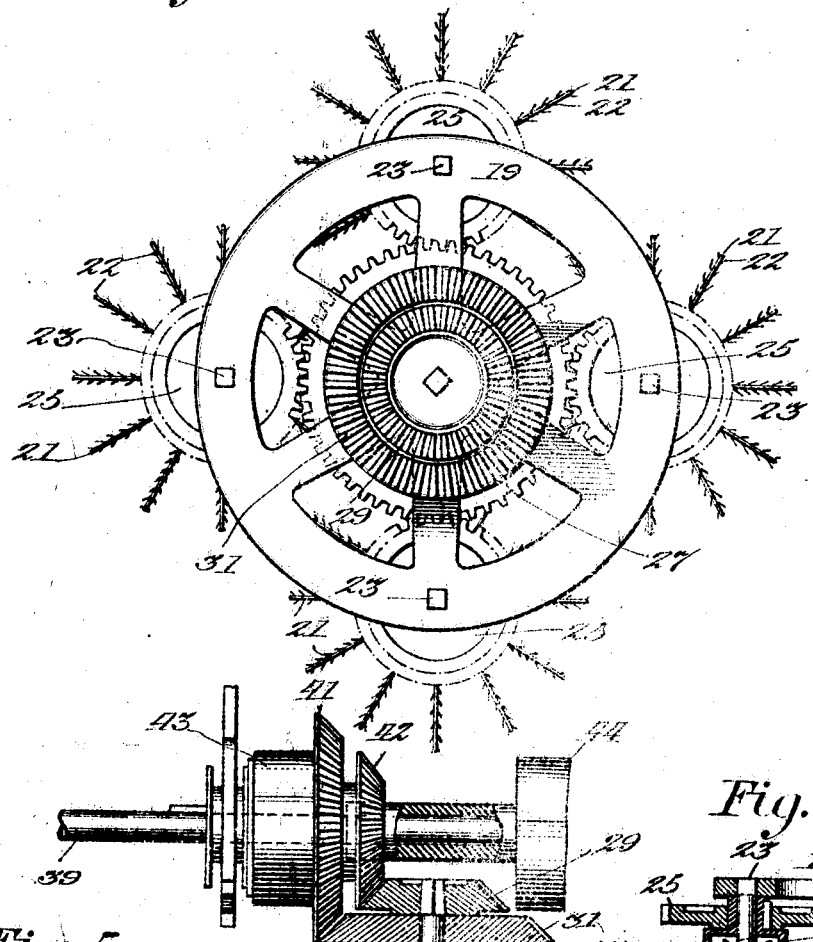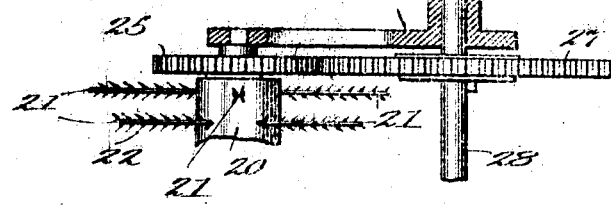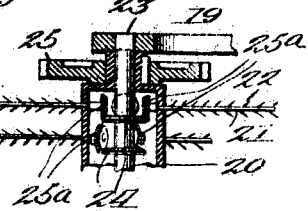

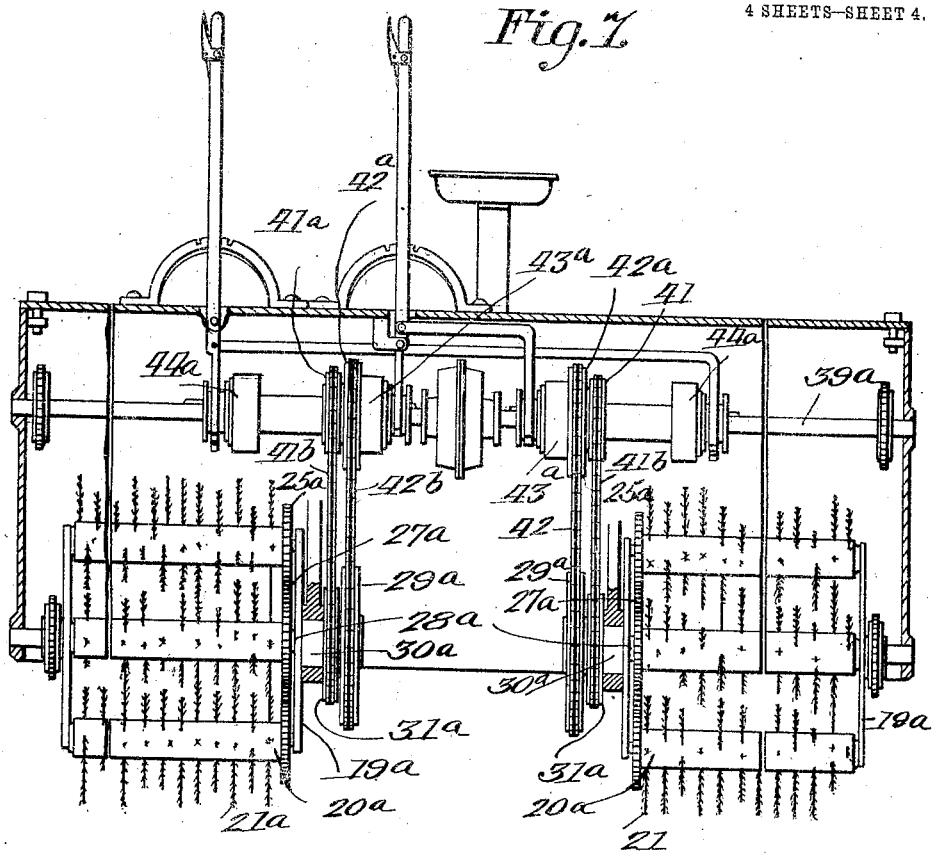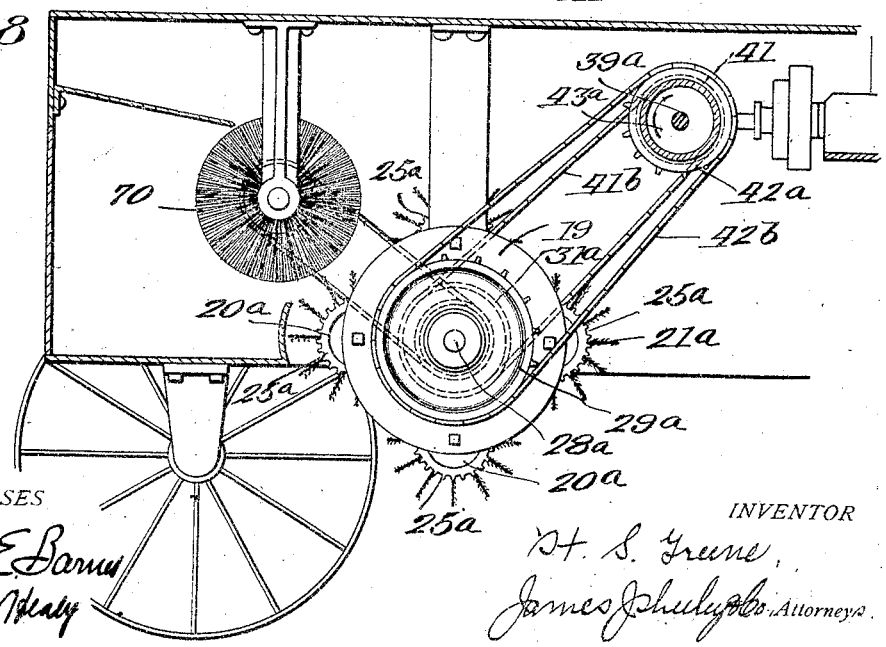

UNITED STATES PATENT OFFICE.

HARRY S. GREENE, OF WOONSOCKET, RHODE ISLAND.

COTTON-HARVESTER.

1,057,236.

Specification of Letters Patent.

Patented Mar. 25, 1913.

Application filed May 25, 1911. Serial No. 629,262.

*To all whom it may concern:*

Be it known that I, HARRY S. GREENE, a citizen of the United States, residing at Woonsocket, in the county of Providence and State of Rhode Island, have invented new and useful Improvements in Cotton-Harvesters, of which the following is a specification.

My present invention pertains to cotton harvesters; and it has for its general object to provide a cotton harvester embodying means that is adapted during the travel of the machine past cotton plants, to reach into the plants and take hold of the cotton and then move out of the plants, with the gathered cotton, at the points of entry, all after manner of inserting a hand straight among the bolls, gathering the cotton and then drawing the hand with the gathered cotton out of the plant at the place of insertion.

The invention also contemplates the provision of means for removing the gathered cotton from the gathering means of the machine and depositing the cotton so removed in a receptacle or receptacles carried by the machine, thereby keeping the gathering means clear at all times and in that way maintaining the efficiency thereof.

To the attainment of the aforesaid general object, the invention consists broadly in an upright or a horizontally-disposed drum rotatable about its upright or its horizontally-disposed axis, portable means carrying the said drum, one or a plurality, preferably the latter, of upright or horizontally-disposed gathering rolls carried by the drum and rotatable about their respective axes therein, and means for rotating the gathering rolls about their said axes incidental to the rotation of the drum about its axis.

The invention also consists broadly in the combination with the means stated, of a receptacle, and means for removing the gathered cotton from the gathering roll or rolls and bringing about the deposit of the same in the receptacle.

The invention further consists in the peculiar and advantageous machine hereinafter described and particularly pointed out in some of the claims appended.

In the accompanying drawings which are hereby made a part hereof: Figure 1 is a longitudinal-vertical section of the cotton harvester constituting the best practical embodiment of my invention that I have as yet devised; the same being taken on the line 1—1 of Fig. 3. Fig. 2 is a detail section taken on the line 2—2 of Fig. 1 and showing some of the parts in elevation. Fig. 3 is a view, partly in plan and partly in horizontal section, with the top plate removed. Fig. 4 is an enlarged detail plan showing one of the drums, its gathering rolls and driving connections. Figs. 5 and 6 are fragmentary vertical sections of the same, hereinafter specifically referred to. Fig. 7 is a broken vertical section, hereinafter specifically adverted to, showing a modification in which the drum or drums and the gathering rolls are arranged to rotate about horizontal or approximately horizontal axes. Fig. 8 is a detail longitudinal vertical section of the same.

Similar numerals of reference designate corresponding parts in Figs. 1–6 of the drawings.

The present embodiment of my invention is of the motor-vehicle type, though it is to be understood that the machine may be horse-drawn or may be moved in any other manner consonant with the purpose of my invention without involving departure from the scope of the same as claimed.

In Figs. 1–6, the machine comprises a suitable main frame mounted on rear wheels 1 and forward wheels 2; the forward wheels being carried by horizontally-swinging knuckles 3 that are pivoted at 4 to the main frame, and are connected together through cross-bar 5, Figs. 1 and 3. One of the knuckles 3 is provided with a rearwardly-directed arm 6. To the said arm 6 is pivoted at 7 a rod 6$^a$ to which is pivoted a horizontally-swinging crank 8 on a vertical shaft 9, the latter being journaled in the main frame and being provided with a spur-gear 10 that is intermeshed with a similar gear 11 on an upright shaft 12 through the medium of which the machine is steered. The forward portion 13 of the main frame is arched, as best shown in Fig. 1, to enable it to pass over or straddle cotton plants during the travel of the machine. In addition to the said forward portion 13, the main frame comprises a transverse engine-support 14 suitably fixed with respect to the forward portion 13, and casing portions 15 suitably connected together at 16, Figs. 1 and 3, and fixed with respect to the portions 13 and 14, and disposed at opposite sides of and extending in rear of the latter.

As will be seen by comparison of Figs. 1 and 3, receptacles 17 for cotton are provided in the casing portions 15, which receptacles have openings 18 of adequate area in their inner walls. In each receptacle 17 and protruding in part through the opening 18 thereof is one of my novel cotton gathering devices, and as the said devices are identical in construction, a detailed description of the one shown in Fig. 1, in the upper portion of Fig. 3 and in Figs. 4, 5 and 6, will suffice to impart a definite understanding of both. The device referred to comprises a suitably mounted upright or approximately upright drum 19, and upright or approximately upright gathering rolls 20 carried by the drum and grouped about the center thereof and mounted by preference between the heads of the drum and at points adjacent the perimeters of said heads as will be understood by comparison of Figs. 1 and 3. Each of the said rolls 20 is provided with a plurality of fingers 21 adapted to take hold of cotton and remove the same from the bolls of plants, and I would here have it understood that the said fingers 21 may be of any description or type consonant with the purpose of my invention without involving departure from the scope of the same as claimed. In the illustrated and preferred embodiment, however, the fingers 21 are suitably barbed, as at 22, to enable them to take positive hold of the cotton, and are journaled in the rolls 20, which are in the form of hollow cylinders, Fig. 6. It will also be seen by reference to Fig. 6 that each roll 20 loosely surrounds and is rotatable about a shaft 23 held against rotation in the heads of the drum 19, and that fixed on the shaft 23 are miter gears 24 with which are intermeshed miter gears 25ª on the inner ends of the rotatable fingers 21. From this it follows that as each roll 20 is rotated about its complementary shaft 23 held against rotation in the heads of the drum, the fingers 21 will be carried around in horizontal planes with the roll 20 and at the same time will be rotated about their axes in the roll 20 and in that way enabled to effectually take hold of the cotton in the bolls of plants. Each roll 20 is provided near its upper end with a spur gear 25, and within the group of spur gears 25 and intermeshed therewith, Fig. 4, is a comparatively large spur gear 27. This large spur gear 27 is carried by the rotary shaft 28 upon which the drum 19 is loosely mounted and about which said drum is designed to be rotated. The shaft 28 has fixed on its upper end a miter gear 29, and the upper head of the drum is provided with an upstanding sleeve 30 which terminates at its upper end in a miter gear 31.

It will be understood from the foregoing that through the gear 31 the drum 19 is rotatable about the shaft 28, and that through the gear 29 the shaft 28 is rotated independently of the drum; also, that incidental to the rotation of the drum 19 about its axis, the rolls 20 which are carried around by the drum, are rotated about their axes, and the fingers 21 are carried around with said rolls 20. By virtue of the said provision and especially when the rolls 20 are rotated in reverse direction to the drum 19 as indicated by arrows in Fig. 3, and which is the preferred mode, it will be seen that as the driven drum and driven rolls thereof are moved past a cotton plant, the fingers 21 will be caused to enter the foliage of the plant, take hold of cotton in the bolls of the plant and draw the cotton out of the plant at substantially the points of entry of the fingers, all in much the same manner as a person reaching his hand straight in among the bolls gathering the cotton and then drawing the hand and cotton gathered therein out of the plant at the place where the hand was inserted. From this it follows that the drum equipped and operated as described, is possessed of high efficiency in the picking of cotton from plants as the drum is moved along in close proximity to the plants.

When I say that the drum 19 may be either upright or approximately upright, I mean that it may be placed in vertical position or may be inclined to a slight extent from the vertical, the latter arrangement being resorted to when deemed expedient or advantageous in order to better adapt the drum to the general outline of the plants past which it is moved.

When desired, only one drum may be employed, and the said drum and its finger-bearing roll or rolls may be rotated in the manner described by any suitable means, without involving departure from the scope of my claimed invention. I prefer, however, in order to increase the capacity of the machine and conduce to economy in the operation thereof to employ two drums relatively arranged as shown, and therefore adapted to simultaneously operate at opposite sides of the cotton plants in a row while the machine is moved along and over the said row. I also prefer to rotate the drums 19 and the rolls 20 thereof by the means hereinbefore specifically described, in combination with the mechanism best shown in Figs. 2, 3 and 5, which mechanism comprises an internal combustion engine 35 mounted on the frame portion 14 and having a shaft equipped with a conventional speed-changing device 36 and a conventional clutch 37 for establishing and interrupting connection between the engine shaft and a shaft 38 alined with said engine shaft; transverse shafts 39 connected through a conventional equalizer 40 with the shaft 38; gears 41 surrounding the shafts 39 and intermeshed with the gears 31 of the drums 19; gears 42 surrounding the shafts 39 and intermeshed with the gears 29; conventional speed-changing devices 43 interposed between the shafts 39 and the gears 41; and conventional speed-changing devices 44 interposed between the shafts 39 and the gears 42. The said speed changing devices 43 are connected with a hand lever 45, Figs. 1 and 2, and the said speed-changing devices 44 are connected with a similar lever 46, both levers being within convenient reach of the driver of the machine when on the seat 47 shown in Figs. 1 and 2. By manipulating the levers 45 and 46, the driver is enabled to vary the speeds of the drums 19 and the gathering rolls 20, as occasion demands.

50, Figs. 1 and 2, is the top plate of the machine frame. The said top plate is arranged on and suitably connected to the casing portions 15, and serves to carry the levers 45 and 46 and the driver's seat 47, as well as the upper bearing 51 of the steering shaft 12. A driving connection is provided between one of the shafts 39 and one of the shafts 60 on which the wheels 1 of the machine are mounted; the said connection including a sprocket gear 61 fixed on the shaft 60, a sprocket gear 62 surrounding the mentioned shaft 39, a belt 63 connecting the gears 62 and 61, and a conventional speed-changing device 64 interposed between the shaft 39 and the gear 62 and actuable by a lever 65, Figs. 2 and 3.

The speed-changing devices *per se* are conventional and form no part of my present invention, and since they may be employed or omitted without affecting my invention, I have deemed it unnecessary to illustrate them in detail.

Any suitable means may be employed for removing the gathered cotton from the fingers 21 of the rolls 20 without involving departure from the scope of my claimed invention. I prefer, however, to employ for the said purpose, the upright or approximately upright strippers 70 which are in the form of rotary brushes through the bristles of which the fingers 21 pass as the drums 19 rotate. The said strippers 70 are mounted in the rear portions of the receptacles 17 and are rotated from the shafts 39 through the medium of sprocket gears 72 on said shafts 39, intermediate horizontal shafts 73, sprocket gears 74 thereon, sprocket belts 75 connecting the gears 72 and the gears 74, and miter gears 76 on the shafts 73, intermeshed with miter gears 77 on the shafts of the strippers. The cotton removed by the strippers 70 from the fingers 21 of the gathering rolls 20 is deposited in the rear portions of the receptacles 17 or in other suitable receptacles (not shown) placed to receive it.

It will be materially advantageous under some conditions to have the drum or drums and the gathering rolls carried thereby rotate about horizontal or substantially horizontal axes. For instance with the drum or drums and gathering rolls arranged horizontal or approximately horizontal each drum is enabled to span several rows of cotton plants in such manner as to adapt the fingers on the gathering rolls to reach down into the plants from above the same and take the cotton from bolls with the same motion as before described with reference to Figs. 1 to 6. Moreover with the horizontal or substantially horizontal arrangement of drum or drums and gathering rolls, the rows of plants can be placed quite close together and the passages between plants can be arranged a considerable distance apart to bring about increased acreage of production.

With the foregoing in mind I have devised the embodiment of my invention shown in Figs. 7 and 8, referring to which: $39^a$ $39^a$ are transverse shafts designed to be connected with and driven by a motor in the same manner as the shafts 39 before described. In addition to the shafts $39^a$ the embodiment of Figs. 7 and 8 comprises suitably-mounted horizontal or approximately horizontal drums $19^a$; and horizontal or approximately horizontal gathering rolls $20^a$ carried by the drums and grouped about the centers thereof and mounted by preference between the heads of the drum, as shown. Each of the said rolls $20^a$ is provided with a plurality of cotton-taking fingers $21^a$ which may be of any suitable description. The said fingers $21^a$ may be fixed to the rolls $20^a$ or else may be mounted in their respective rolls and rotated about their axes incidental to the rotation of the rolls about their axes, by the means shown specifically in Fig. 6. Each roll $20^a$ is provided near its inner end with a spur gear $25^a$, and within the group of spur gears $25^a$ and intermeshed therewith, Fig. 7, is a comparatively large spur gear $27^a$. The spur gears $27^a$ are carried by rotary shafts $28^a$ upon which the drums $19^a$ are loosely mounted and about which said drums are designed to be rotated. The shafts $28^a$ have fixed on their inner ends sprocket gears $29^a$, and the inner heads of the drums are provided with sleeves $30^a$ which terminate at their inner ends in sprocket gears $31^a$. The shafts $39^a$ are equipped with sprocket gears $41^a$ connected through belts $41^b$ with the sprocket gears $31^a$ of the drums $19^a$; sprocket gears $42^a$ surrounding the shafts $39^a$ and connected through belts $42^b$ with the gears $29^a$; conventional speed-changing devices $43^a$ interposed between the shafts $39^a$ and the gears $41^a$ and designed to be operated in the same manner as the devices 43 of Figs. 1–3; and conventional speed-changing devices $44^a$ interposed between the shafts 39ª and the gears 42ª and designed to be operated in the same manner as the devices 44 of Figs. 1–3.

It will be gathered from the foregoing that as the embodiment shown in Figs. 7 and 8 is moved along between cotton plants at opposite sides of its path, the drums will overhang the cotton plants, and as the drums are rotated about their axes, the gathering rolls will be rotated about their axes, and the fingers 21ª will reach from above the plants down into the plants and take hold of the cotton and will then move out of the plants, with the gathered cotton, at the points of entry in the manner before mentioned—i. e., after the manner of inserting a hand straight among the bolls, gathering the cotton and then drawing the hand with the gathered cotton out of the plant at the place of insertion.

Like the embodiment shown in Figs. 1 to 6, the embodiment shown in Figs. 7 and 8 may comprise one drum or a plurality of drums. I would also have it understood that in either embodiment of my invention strippers 70 or any other suitable means may be employed to remove the gathered cotton from the fingers of the gathering rolls; the salient feature of my invention residing in a cotton harvester comprising a drum rotating about an axis, and gathering devices or rolls equipped with gathering means and carried by the drum and operating about axes independent of the drum axis.

Having described my invention, what I claim and desire to secure by Letters-Patent, is:

1. A cotton harvester comprising portable means, a drum carried thereby and rotatable about an axis, means for so rotating the drum, cotton gathering rolls carried by the drum and grouped about the center thereof and rotatable independently of the drum through complete circles about axes of their own, said axes of the rolls being parallel to the axis of the drum; means for rotating said rolls through complete circles about axes of their own during rotation of the drum, a plurality of fingers carried by and grouped about each roll; said fingers being constructed to gather cotton, and means for rotating the said fingers about their axes during rotation of the rolls.

2. A cotton harvester comprising portable means, a drum carried thereby and rotatable about an axis, cotton gathering rolls carried by the drum and grouped about the center thereof and rotatable independently of the drum through complete circles about axes of their own, said axes of the rolls being parallel to the axis of the drum, means for rotating said rolls through complete circles about axes of their own during rotation of the drum, a circular series of fingers carried by each roll; each of said fingers being provided with barbs extending laterally therefrom, means for rotating the said fingers through complete circles about axes of their own during rotation of the drum and the rolls, a rotary stripper carried by the portable means for removing the gathered cotton from the fingers of the gathering rolls, means for rotating said stripper through a complete circle during rotation of the drum, rolls and fingers, and means also carried by the portable means for receiving the cotton so removed.

In testimony whereof I have hereunto set my hand in presence of two subscribing witnesses.

HARRY S. GREENE.

Witnesses:
 FRANCES L. COYLE,
 PETER COTE.